(12) United States Patent
Evans et al.

(10) Patent No.: US 6,816,267 B2
(45) Date of Patent: Nov. 9, 2004

(54) APPARATUS AND METHOD FOR CALIBRATING AN INTERFEROMETER USING A SELECTIVELY ROTATABLE SPHERE

(75) Inventors: Christopher James Evans, Higganum, CT (US); Michael Küchel, Oberkochen (DE); Carl A. Zanoni, Middlefield, CT (US)

(73) Assignee: Zygo Corporation, Middlefield, CT (US)

(*) Notice: Subject to any disclaimer, the term of this patent is extended or adjusted under 35 U.S.C. 154(b) by 199 days.

(21) Appl. No.: 10/277,553

(22) Filed: Oct. 22, 2002

(65) Prior Publication Data

US 2003/0090798 A1 May 15, 2003

Related U.S. Application Data

(60) Provisional application No. 60/333,245, filed on Nov. 14, 2001.

(51) Int. Cl.[7] .................................................. G01B 9/02
(52) U.S. Cl. ....................................... 356/515; 356/512
(58) Field of Search ............................... 356/515, 511, 356/512, 513, 514, 495, 489

(56) References Cited

U.S. PATENT DOCUMENTS

| | | | |
|---|---|---|---|
| 3,930,729 A | | 1/1976 | Gunn |
| 5,929,992 A | * | 7/1999 | Stenton et al. ............... 356/511 |
| 6,515,750 B1 | * | 2/2003 | Malyak et al. .............. 356/512 |
| 6,734,979 B2 | * | 5/2004 | Evans et al. ................. 356/512 |

OTHER PUBLICATIONS

Evans, Chris J., et al., "Self–Calibration reversal, redundancy, error separation, and "absolute testing"", CIRP Annals, vol. 45/2, 1996.

Parks, R. E., Evans, C. J., and Shao L. Z., "Calibration of interferometer transmission spheres", OSA 'Optical Fabrication and Testing Workshop, vol. 12, 1998 Technical Digest, pp80–83.

Epstein, L., "A device for deflecting light beams through very small angles", Applied Optics, vol. 10 (1971), No. 1, p73.

Evans, C. J., and Estler, W. T., "Self–Calibration: reversal, redundancy, error separation and "absolute testing"", ASPE Tutorial notes (1997).

International Search Report mailed on Apr. 10, 2003 in International Patent Application No. PCT/US02/33765.

* cited by examiner

Primary Examiner—Frank G. Font
Assistant Examiner—Andrew H. Lee
(74) Attorney, Agent, or Firm—Francis J. Caufield

(57) ABSTRACT

An optical sphere of nominal radius is positioned and supported within an assembly so that is can be activated with a predetermined motion with respect to an incoming converging spherical wavefront from an interferometer to calibrate the interferometer by determining the differences between the converging spherical wavefront and the reflected wavefront from portions of the area of the optical sphere as sampled thereover. The nominal optical sphere supported and sampled in this way mimics a "perfect" comparison sphere from which the systematic error of the interferometer wavefront may be determined. The optical sphere is preferably hollow and composed of Zerodur®. Internal magnets in conjunction with external induction coils provide motion control while the optical sphere is mounted on an air bearing for freedom of rotation and safety in transportation.

9 Claims, 5 Drawing Sheets

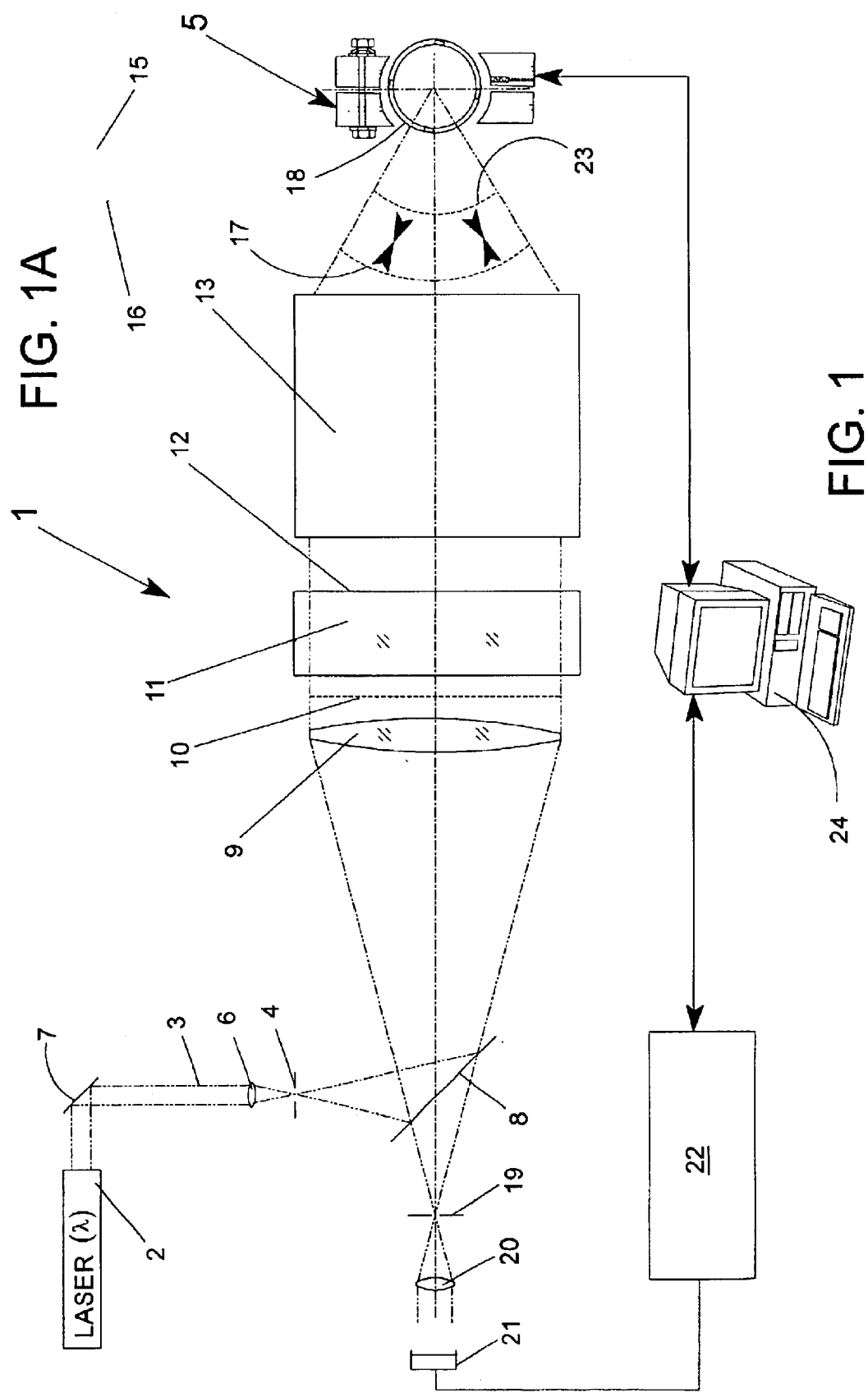

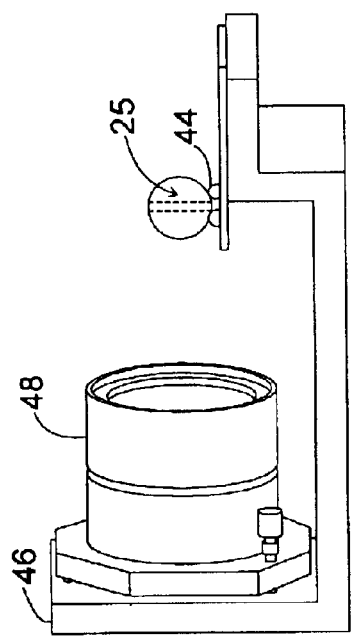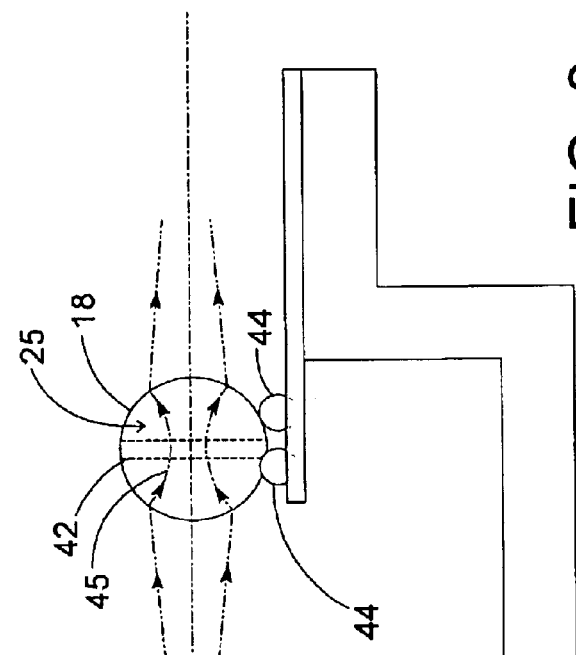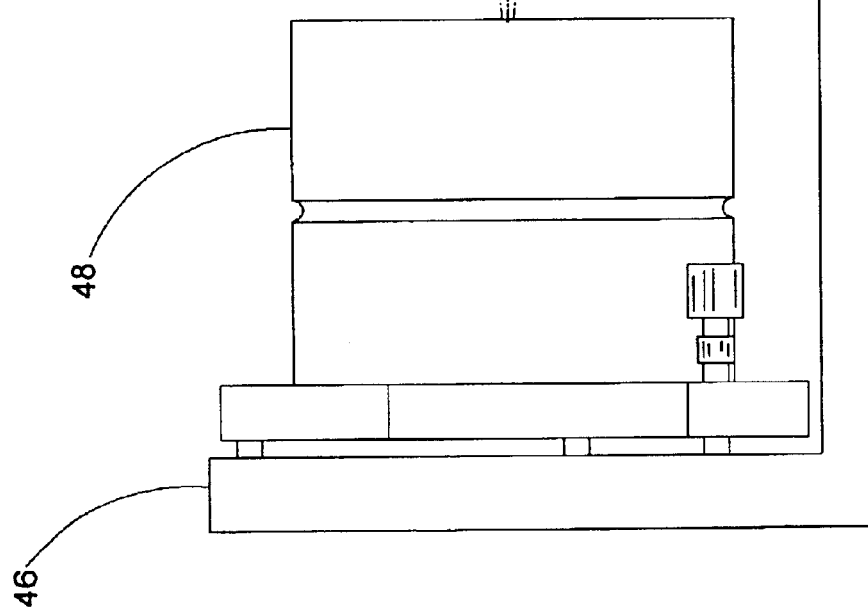

APPARATUS AND METHOD FOR CALIBRATING AN INTERFEROMETER USING A SELECTIVELY ROTATABLE SPHERE

CROSS REFERENCE TO RELATED APPLICATION

This application claims priority from U.S. Provisional Patent Application No. 60/333,245 filed on Nov. 14, 2001 in the name of Christopher James Evans, et al. with the title "Apparatus And Method For Calibrating An Interferometer Using A Selectively Rotatable Sphere", the contents of which are incorporated herein by reference in their entirety.

BACKGROUND OF THE INVENTION

This invention generally relates to interferometry and, more particularly, to the use of a selectively rotatable optical sphere in conjunction with mathematical sampling procedures to automatically calibrate an interferometer.

Full aperture interferometers are commonly used to measure the "figure" of optical components. "Figure" is typically taken to mean the low spatial frequency departure from nominal. Since interferometers used are comparators, the data reported is, in effect, the difference between two surfaces, a "reference" surface and the object under test.

Deducing the departure from nominal of the reference surface itself has been an area of active development for over 100 years. Lord Rayleigh, for example, pioneered the use of liquid surfaces as a "perfect" reference for flats. A catalog of well-known methods in optical, as well as mechanical metrology, can be found, inter alia, in Evans C. J, Hocken R. J., and Estler W. T. "Self-calibration: reversal, redundancy, error separation and "absolute testing"." CIRP Annals, Vol 45/2 (1996) pp617–634.

In optical testing of spherical wavefronts, a number of techniques are known, and all have advantages and disadvantages. One technique known as ball averaging has some significant advantages in conceptual simplicity and ease of implementation. The basic idea of ball averaging to calibrate the spherical wavefront of an interferometer is that the expected value of the average of a number of measurements (made with a perfect instrument) of the surface departure (from a sphere) of sub-aperture segments of a sphere is zero. Since the systematic errors of the instrument appear in every measurement, the expectation value of the average of a number of measurements converges to the systematic error in the instrument.

Parks, Evans, and Shao (Parks R. E., Evans C. J. and Shao L-Z. "Calibration of interferometer transmission spheres" OSA 'Optical Fabrication and Testing Workshop, Vol 12, 1998 Technical Digest Series, pp80–83) described setting a spherical ball in a kinematic (3-ball) seat, rotating the ball manually between measurements, and then averaging. Evans and Parks (Evans C. J. and Estler W. T. "Self-calibration: reversal, redundancy, error separation and "absolute testing"." ASPE Tutorial notes (1997 et seq)) also showed that a reasonable ball could be floated in an air bearing seat and data taken as the ball spins. However, due to density variations, the center of mass and the geometric center of the ball will-be different, which causes the ball to tend to settle (eventually) in a fixed orientation. Stopping the ball periodically and restarting rotation with a different set of initial conditions is thus recommended. Epstein (Epstein L. "A device for deflecting light beams through very small angles" Applied Optics, Vol 10(1971) No 1, p73) shows the fabrication of a ball from two optically contacted hemispherical pieces of glass of different refractive index.

Sawyer (Sawyer B. A. (1968) U.S. Pat. No. 3,376,578) described a planar, two-dimensional magnetic positioning device for driving chart plotters and other devices.

The major disadvantages of ball averaging, at least in known implementations, are that:

1. Significant operator intervention and physical handling of the ball, both in set-up and during testing, are required;
2. Coherent reflections between the front and back surfaces of the ball arise if a transmissive ball is used; and
3. The uncertainty of the measurement process decreases at best as the square root of the number of measurements taken.

Consequently, it is a primary purpose of the invention described here to substantially reduce the disadvantages noted above without mitigating any of the advantages.

Another object of the present invention is to provide apparatus and methods by which an optical sphere can be rotatably supported to enable interferometric random sampling of its surface to calibrate an interferometer for subsequent use in measuring test surfaces.

Another object of the present invention is to provide apparatus and methods by which an interferometer may be calibrated by mathematically sampling the average interferometric differences between a wavefront provided by the interferometer and the surface of a rotatable optical sphere.

It is another object of the present invention to provide apparatus and methods by which an interferometer may be automatically calibrated.

Yet another object of the present invention is to provide an optical sphere calibration device that can be used in a variety of orientations.

Other objects of the invention will, in part, be obvious and will, in part, appear hereinafter when the detailed description is read in conjunction with the drawings.

SUMMARY OF THE INVENTION

The present invention is an interferometric apparatus and method for calibrating the spherical wavefront or reference surface of an interferometer by performing appropriate mathematical operations, such as averaging, on the reported results taken at some number of selected positions on the surface of an optical sphere which may be rotating while data is taken or may be stationary while data is taken and rotated between cycles of data acquisition. The apparatus comprises a rotatable, preferably hollow, polished optical sphere constructed from a number (two or greater) of segments with a partially or completely reflecting external surface. Where the external surface is only partially reflecting and the underlying material of construction is transmissive at the operating wavelength of the interferometer, the inner structure of the sphere is made to preclude unwanted reflections of light from other surfaces back to the interferometer. Alternatively, solid spheres may be assembled from segments, for example, if the material of choice does not transmit at the wavelength of the interferometer to be tested or the fabricator prefers such a design.

Also included is a stationary hollow seat or system of "point" constraints which either coarsely or completely define the center of rotation of the sphere. Active or passive devices are preferably imbedded in the sphere and interact, without contact, with complementary devices in the stationary seat and used either to affect ball motions (rotations and/or translations of the ball center) or to sense those motions.

Means are provided, as needed, to levitate and rotate as, for example, air or magnetic bearings. The optical sphere seat may optionally have means to lock ball rotation at some chosen position both during measurement or for protection during shipping and handling.

The means of attaching the optical sphere segments is preferably stable thermally, chemically, and dimensionally. The materials of construction of the optical sphere and seat are preferably of low coefficient of thermal expansion, and the optical sphere is preferably polished or otherwise produced so that the departures from a best fit sphere are small. The exact radius of curvature of the sphere is immaterial to the basic functionality, and is to be selected based on considerations of the specific embodiment of the present invention.

BRIEF DESCRIPTION OF THE DRAWINGS

The structure, operation, and methodology of the invention, together with other objects and advantages thereof, may best be understood by reading the detailed description in connection with the drawings in which each part has an assigned numeral or label that identifies it wherever it appears in the various drawings and wherein:

FIG. 1 is a diagrammatic elevational view of interferometer system employing a selectively rotatable optical sphere for use in calibrating the interferometer;

FIG. 1A is a diagrammatic elevational view of an optical element that may be measured in the interferometer system of FIG. 1;

FIGS. 3 and 3A show a Zerodur® optical sphere on a kinematic seat with an ultrasonically drilled hole to center for scattering light.

DETAILED DESCRIPTION

Figure 2A:
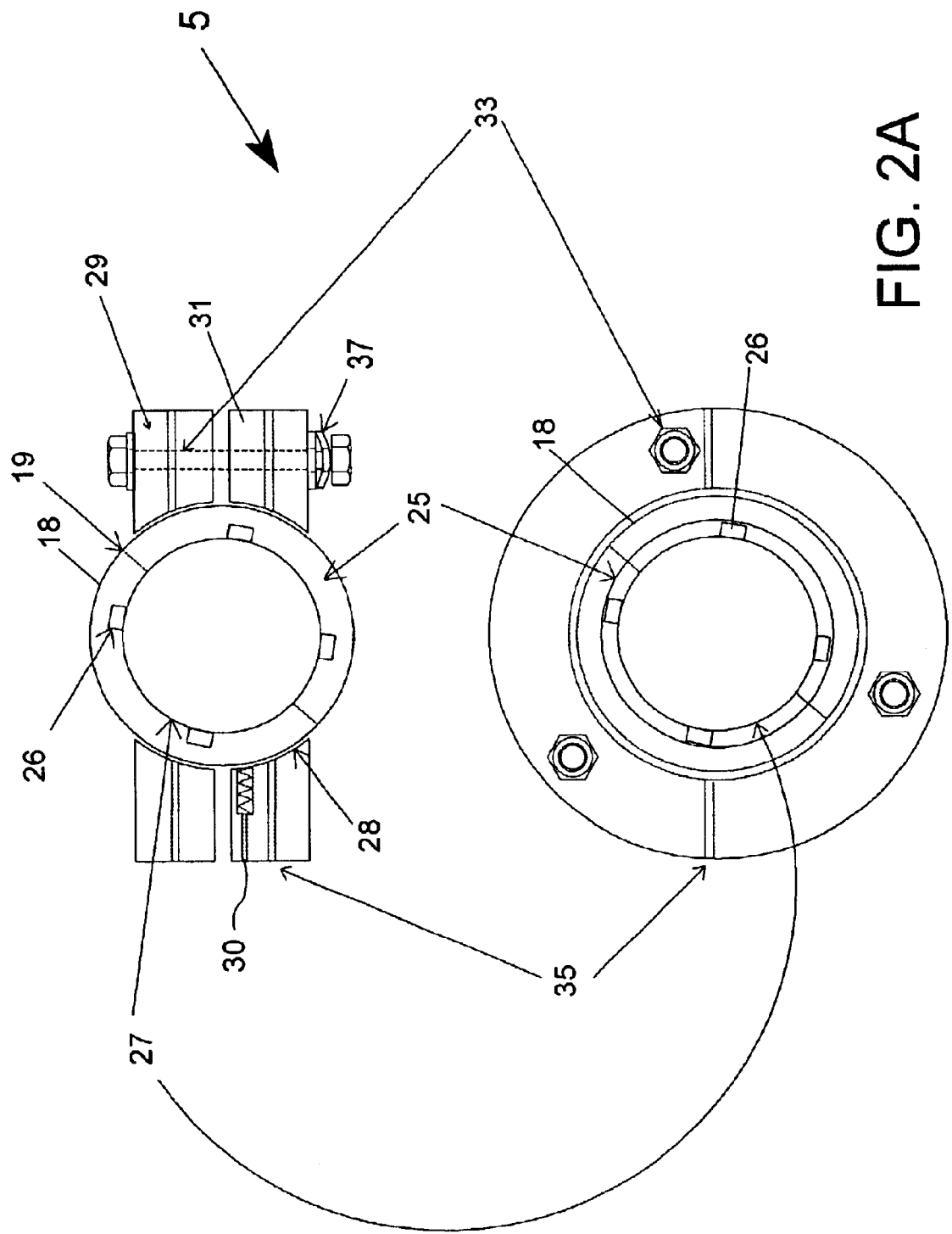
FIG. 2a is a diagrammatic side and front view of a support system by which an optical sphere may be selectively rotated in a predetermined manner.

The present invention provides apparatus and means for the rapid and automated calibration of a converging, spherical wavefront emerging from measuring interferometers or a spherical reference surface. The underlying approach is to use a form of "ball averaging" maintaining known prior advantages while obviating or mitigating known disadvantages.

Reference is now made to FIG. 1, which shows an interferometric system 1 that can be used to perform high precision measurement of, for example, an optical element 15 carrying an aspherical surface 16 (See FIG. 1A, upper right). The process for measuring surface 16 is a combination of two steps. The first step is a "calibration step", and the second step is a "measurement step". In FIG. 1, system 1 is shown in its calibration mode where an optical sphere assembly 5 is employed for calibration purposes.

In FIG. 1, a laser 2 is shown, which emits a beam 3 at wavelength λ. Beam 3 is redirected downwardly by a reflecting element 7 and is then focused to a small spot with the help of lens 6 while cleaned by a small pinhole 4. The pinhole 4 is located in the focal plane of a well-corrected collimator lens 9, which is configured to produce plane wavefronts 10 (only one shown) at the operating wavelength. Plane wavefronts 10 are incident to a plane plate 11 that includes a very high quality plane surface 12, at its rear side. This element is called a "transmission flat".

The plane wavefront 10 emerging from the transmission flat enters a null-system 13, which appears only very schematically as a "box", not showing the details of the optical lay-out. This lay-out depends on the exact functionality of the lens for a given task and can differ considerably from case to case. For present purposes, the lens system 13 produces a wavefront 17, which is close to a spherical wave (nominally spherical, with deviations small enough to be measured with high accuracy; note that this can still be several "fringes", i.e., the deviation in the interferogram can be as large as several wavelengths!). The actual deviations of the wavefront 17 from it's theoretical design value, which is produced by the real manufactured system 13, are tested with very low uncertainty with the help of optical sphere assembly 5, which has a surface 18 of known deviations from an ideal sphere.

Nominally spherical wavefront 17 is focused at the center of curvature of surface 18. As such, it impinges on surface 18, being reflected thereby to return as expanding wavefront 23 that is combined with the reference wavefront generated by transmission flat 12 to form an interferogram containing phase information about the differences between the shapes of the wavefronts 17 and 23. This interferogram is focussed by lens 9 onto pinhole 19, after which it diverges to become collimated by lens 20, and then impinges on a photodetector 21. Photodetector 21 provides an electronic signal to analyzer 22 with the results subsequently fed to a computer 24. Computer 24 is provided in a well-known manner with suitable instructions to perform the various analytical operations involved in data acquisition and reduction, provide an operator interface, display results, control the operation of optical sphere assembly 5, receive positional signals and data from optical sphere assembly 5, and perform general housekeeping functions.

The basic structure of the optical sphere assembly 5 is shown schematically in FIG. 2a. A preferably hollow glass optical sphere 25 is fabricated by adhering together two (or more) hollow segments of a sphere. The segments should be contacted in a method that is temporally, thermally, chemically and mechanically stable and provides, after final polishing, a minimal discontinuity in the optical surface of the optical sphere.

The latter requirement depends on the spatial resolution of the specific interferometer being used and the specifics of the data reduction scheme. The joint 19 must not introduce artifacts (such as spurious steps) into the data. This condition is easily met by making the width of the joint 19 less than the resolution limit of the instrument so that the surface appears essentially continuous across joint 19. These conditions are met by an optically contacted joint 19 or a joint made between two polished glass surfaces contacted in the presence of potassium hydroxide. Other joint methods—such as thermal diffusion, oxide bonding, brazing, cementing—can be employed and applied as appropriate for a given material or set of materials selected for an actuated or sensed optical sphere that falls within the general scope of the present invention.

The material of construction of sphere 25 is preferably a ceramic material such as that manufactured under the tradename Zerodur®, marketed by Schott Optical of Duryea, Pa., although other materials may be used. The primary advantages of Zerodur® are:

1. The sphere segments may be optically contacted prior to final polishing of the outside, resulting in an invisible (of functionally so) join between the parts;
2. It can be polished using conventional optical techniques to excellent figure and finish tolerances;
3. The surface reflectivity is close to that of conventional glasses, so the resulting fringe contrast in the interferogram is high when testing uncoated glass surfaces; and
4. It has a coefficient of thermal expansion which may be taken, practically, to be zero and, hence, is insensitive to environmental changes, thermal gradients caused by Joule-Thompson cooling at the exhaust of the gas bearing (see below), etc.

Other materials of construction may be used. Super Invar, for example, also has a low coefficient of thermal expansion, although not as low as Zerodur, and it cannot be polished as well. Some ceramics (especially hot isostatically pressed silicon nitride) can be polished to nearly as good a finish as Zerodur (although with greater difficulty); but they do not have the near zero coefficient of thermal expansion, cannot easily be optically contacted, and have higher reflectivities than most glasses.

Black filter glasses have been used. They have the right reflectivity, but poor thermal expansion, are soft and hence easily damaged during fabrication and/or subsequent handling, and are only available in limited sizes. Spheres might be made from a variety of metals, refractory compounds or composites. Such spheres are likely to be robust but unlikely to be produced with the fine surface quality readily obtainable on glasses. A variety of conventional optical glasses could be used, but none has all of the advantages of Zerodur®, and all (except the black glass) have the same disadvantages.

The primary disadvantage of Zerodur is that it has reasonably good transmission at visible wavelengths. It has been found that, for monolithic 50 mm diameter spheres, the transmission was high enough that coherent fringe patterns were formed from reflections from both the surface of the sphere nearer the interferometer and that further away. This problem may be solved by ultrasonically drilling a hole 42 (see FIG. 3) that passes through the center of the ball 25. The rough surface scatters/diffuses incident, thus ensuring that there is no coherent reflection from the rear surface. Inevitably some scattered coherent light returns to the interferometer, but the intensity distribution changes as the sphere position is changed, and so, the contribution to the measured wavefront also averages to an expected value of zero.

The disadvantages of this approach are that:

1. It creates a "forbidden" zone, which provides no reflections. Fundamentally, it is, therefore, not possible to sample the entire sphere surface. In addition, the software provided with some interferometers will not average any part of the composite where there is "missing" data from any of the individual interferograms. In this case, a small hole in the surface effectively precludes the use of a segment of the surface of twice the included angle of the illuminating cone of the interferometer under test.
2. The drilled hole necessarily causes the sphere to be severely unbalanced, creating problems in the gas bearing implementation (see below).

Referring again to FIG. 2a, it can be seen that by making the optical sphere 25 from, at minimum, two segments of a sphere these problems are eliminated. Assuming the two sections to be hemispheres, it is immediately apparent that grinding a concentric internal hemisphere in each part before combining them creates a desired diffuse inner surface 27 in an artifact (hollow sphere) which, in principle, may have its center of mass exactly coincident with the center of the sphere. For manufacturing or other convenience, more than two segments may be used. Note that alternate means (such as application of "optical blacks", or suspensions of fine particles in index matching lacquers, etc. on the inside surface of the sphere) may be used to suppress unwanted reflections Most conventional implementations of ball averaging use a kinematic (three ball) seat for the test sphere. The operator is then required to rotate the sphere manually between measurements. The present invention does not require active operator involvement in the measurement process. Hence, there is no affect on the instrument and environment of the operator's presence. Data may be taken almost continuously, rather than requiring the extended attention (hours) of an experienced operator to take, for example, 100 measurements of different positions on the sphere, given that a reasonable settling time for the environment and test set-up is needed between rotating the ball and taking the next measurement.

The present invention also does not require an operator to be conscious of the desire to obtain random samples of the spherical surface, and make moves of the optical sphere that would tend to achieve this object.

In the present invention, the optical sphere contains a number of embedded (preferably permanent) magnets 26 distributed uniformly around the near surface of the optical sphere 25. An air bearing seat 28 formed by and between an upper mount plate arrangement 29 and lower mount plate arrangement 31 connected by bolts 33 (see FIG. 2a) is provided with a number of electromagnetic coils 30 (only one shown) which can be used in two complementary modes, as actuators or as sensors.

The sensor mode may be understood from the following description. With the optical sphere 25 rotating, magnets pass the coils, inducing electric currents which may be sensed with appropriate, well-known circuitry. The direction of the instantaneous axis of rotation of the sphere (and the areal density of magnets) determines the pulse frequency seen by any individual coil. By inference, therefore, continuous variation in the axis of rotation of the sphere 25, with respect to the spherical seat 28, results in constantly changing signal characteristics in the pick-ups. If, however, the sphere 25 tends to rotation about a single axis, then the Fourier transform of the output of any pick-up will be dominated by a specific frequency.

Alternatively the coils 30 may be wound and energized in such a manner that the resulting magnetic field is sufficient to apply a sensible force to the permanent magnets 28 in the sphere 25. Hence, by appropriate cycles of energizing some or all of the coils 30, the motion of the optical sphere 25 in its air bearing seat 28 can be modified, for example, more random motion achieved. All of the necessary signals to accomplish this are, of course, exchanged between the optical sphere assembly 5 and computer 24, which is configured to manage those signals as well.

A related mode of operation may be understood by analogy. A uniform distribution of magnets and of coils appears to be an analog of the linear motors becoming increasingly popular in precision motion applications, such as diamond turning machines and steppers. Appropriate modulation of the current through the coils 30 will drive the optical sphere 25 in a systematic manner; control schemes to drive the optical sphere 25 in this predetermined manner are spherical analogs of well-known schemes (e.g. that described by Holmes M., Trumper D., and Hocken R. "Atomic-precision motion control stage" CIRP Annals, Vol 44/1 (1995) pp455–60) that are used in, for example, stages in lithography systems.

It is also possible to actuate (but not sense) the optical sphere 25 from a solid piece of a conductive material, where appropriate currents and fields would be induced in the optical sphere 25. A similar effect could be achieved using an appropriate coating on a substrate with, for example, better thermal properties.

Differences between the incoming nominally spherical wavefront from the interferometer and reflected wavefronts from optical sphere 25 are processed using numerical techniques selected from the group comprising, averaging, spatial filtering, Fourier analysis, and filling to polynomial expansions.

In the foregoing manner, control means are provided for actuating the optical sphere 25 of nominal radius to undergo a predetermined motion such that interferometrically measured differences between the wavefront 23 reflected from the nominal optical sphere 25 and the incoming wavefront 17 from the interferometer, when sampled over the surface of the nominal optical sphere 25 as it moves, converge to the departure in the incoming wavefront 17 from its nominal value.

FIG. 2a indicates that the spherical air bearing seat 28 may be constructed of two symmetrical "bands" about the equator of the optical sphere 25. Connecting these bands though an appropriate spring load allows the bands to separate (and hence the ball to move) when air pressure is applied via pneumatic conduits 35. FIG. 2a shows spring loading through three uniformly spaced bolts 33 and a spring (Bellville) washer 37; or alternative spring loading mechanisms having the same effect, can be used. When the air pressure is removed, the bands close on the optical sphere 25, effectively locking it in place. It should now be obvious that, with an appropriate control scheme, the optical sphere 25 can be moved in a predetermined pattern that ensures that the interferometer uniformly samples all parts of its spherical surface 18.

Figure 2B:
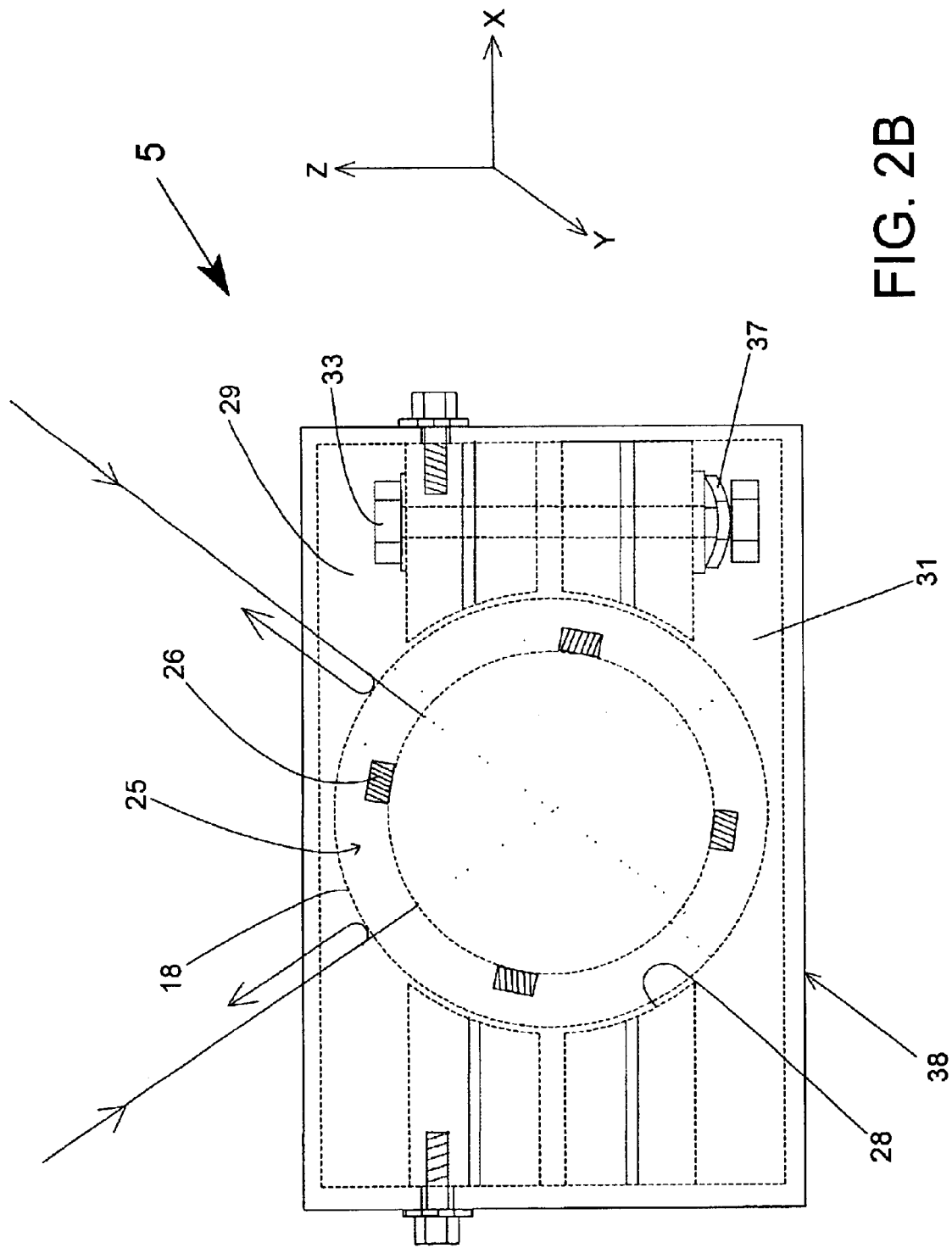
FIG. 2b is a diagrammatic side view of the support system of FIG. 2a shown in a protective box which may readily be integrated into further mounting hardware to align the center of the optical sphere with the focus of the spherical wavefront of the interferometer under test where the inner spherical surface frustrates reflections from its rear surface.
Figure 2C:
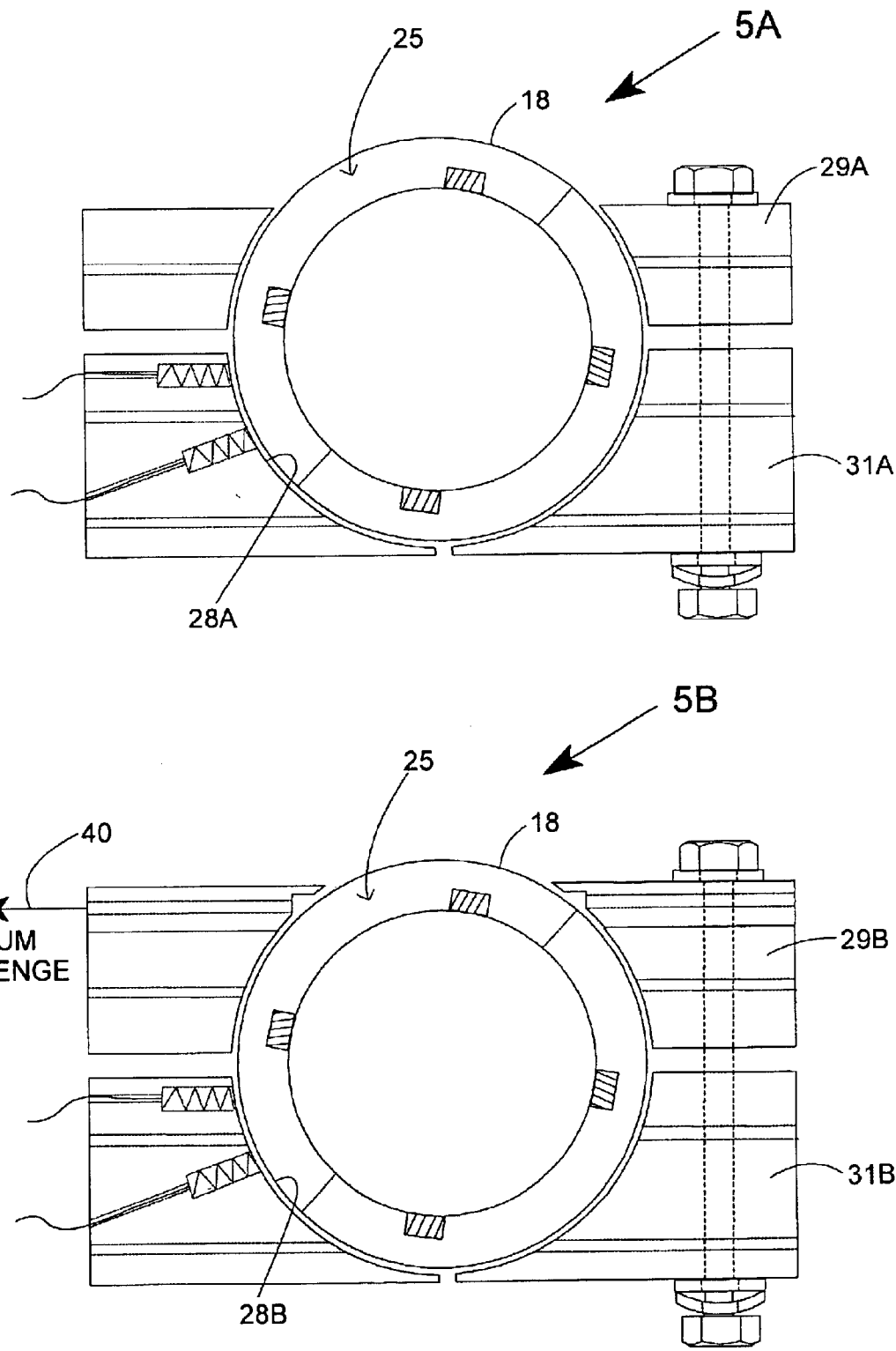
FIG. 2c is a diagrammatic side view of two more alternative support embodiments for practicing the invention showing asymmetric bearing embodiments and vacuum scavenging.

The use of a spring-loaded bearing design clearly provides advantages in protecting the optical sphere 25 in. transit and set up, allows for easy integration of protective encasements 38, etc. (See FIG. 2b). Note that there is no requirement that the two segments of the air bearing 28 be symmetrical (although symmetry does ease the air bearing design and allows for access and use from either side). Asymmetric designs (such as those shown as 5A and 5B in FIG. 2c) provide larger area for supporting of the load (or the use of lower air pressure to obtain the same load support) and a larger area into which detection/actuation coils may be embedded. In FIG. 2C, parts analogous to those appearing in FIG. 2A carry the same numerical identity with A or B appended.

Pressure reduction (expansion) as air exhausts from a pressurized air (gas) bearing results in a local cooling, known as Joule-Thompson cooling. If unregulated, such escaping cool air may cause thermal drifts in optics of the interferometer under test or in fixtures, etc. Further, mixing of this cold air in the test path of the interferometer will increase noise in the measurement (due to variations in the refractive index of the air locally). This effect may be minimized by addition of appropriate vacuum scavenge features as shown 40 in FIG. 2c.

The spherical bearing design may be based on a number of different approaches. For example, the bearing may use porous graphite or bronze, use an inlet compensated orifice design, or an exhaust compensated design. The preferred implementation is to use air bearings, although other implementations are possible. For example, the bearing may involve solid-solid contact; for example, low friction bearings may be constructed using PTFE, filled PTFE and similar polymeric materials, or such so-called "solid lubricants" and molybdenum disulphide. Such implementations will have higher friction than an air bearing and be more susceptible the dirt entrapment and consequent damage. Liquid lubricated designs can also be imagined, although the effect of surface films on the optical sphere 25 would need to be considered; magnetic fluids constrained with an appropriate field (as used, for example, in some shaft sealing applications) may be implemented.

Another possible implementation is to use a sufficient number of magnets and actuator coils both to levitate and actuate the optical sphere.

It should be immediately apparent that in very low friction (e.g., air bearing) implementations, optimum performance is obtained from a system in which the center of mass of the optical sphere coincides with its geometric center. Variations in material density and manufacturing variations (for example during the installation of the permanent magnets) will result in this desirable condition not being reached. Using sensor coils in an air bearing seat during manufacturing, however, can provide the metrology needed to correct the geometric center once the optical sphere has been assembled. If the rough finished optical sphere is placed in the air bearing seat 28, it will settle so that the light spot is at the top (and can easily be marked, for example with a magic marker). If the optical sphere 25 is now moved slightly away from its quiescent position, it will oscillate like a pendulum with a period which gives the pendulum length (i.e., the separation of the center of mass from the sphere center). The period of the oscillation can easily be measured using sensor coil signals (or other means). Knowing both the direction and distance of the displacement of the center of mass from the optical sphere center enables the fabricator to machine the exterior of the assembled optical sphere to compensate as necessary.

FIG. 3 illustrates that the rough surface caused by an ultrasonically drilled hole 42 that passes through the center of the ball 25 scatters/diffuses incident, thus ensuring that there is no coherent reflection from the rear surface. Inevitably some scattered coherent light returns to the interferometer, but the intensity distribution changes as the sphere position is changed, and so, the contribution to the measured wavefront also averages to an expected value of zero. In this arrangement, spherical ball 25 with its exterior surface 18 has been supported on a kinematic support formed of three balls 44 (only two shown) while being illuminated by a beam emerging from a lens assembly 48 supported on mounting bracket 46. Curved portion 45 of the light coursing through the center of sphere 25 mimics the diffusion and scattering due to the centrally bored hole 42 with some of the light shown being transmitted through sphere 25.

While the invention has been described with reference to particular embodiments, those skilled in the art, based on the teachings of the invention, will be able to make various modifications to the described embodiments without departing from the spirit and scope of the invention. Accordingly, it is intended that all equivalent embodiments of the invention be within the scope of its claims.

What is claimed is:

1. An optical sphere assembly for use in calibrating an interferometer, said optical sphere assembly comprising:

an optical sphere of nominal radius including internally located motion actuating elements;

means for supporting and positioning said nominal optical sphere such that its center of curvature rests nominally along the optical axis of the interferometer while otherwise being free to rotate; and control means for actuating said nominal optical sphere to undergo a predetermined motion such that interferometrically measured differences between a wavefront reflected from said nominal optical sphere and an incoming wavefront from the interferometer, when sampled over the surface of said nominal optical sphere as it moves, converge to the departure in the incoming wavefront from its nominal value.

2. The optical sphere assembly of claim 1 wherein interferometric measurements of the differences between the incoming nominally spherical wavefront from the interferometer and reflected wavefronts from said nominal optical sphere are processed using numerical techniques selected from the group comprising, averaging, spatial filtering, Fourier analysis, and fitting to polynomial expansions.

3. The optical sphere assembly of claim 1 wherein said nominal optical sphere is hollow constructed of a material that is optically transparent at the operating wavelength of the interferometer.

4. The optical sphere assembly of claim 3 wherein said material is a ceramic material marketed under the tradename Zerodur®.

5. The optical sphere assembly of claim 1 wherein said means for supporting and positioning said optical sphere assembly comprises a means for levitating said nominal optical sphere with respect to a nest.

6. The optical sphere assembly of claim 5 wherein said levitating means comprises an air bearing.

7. The optical sphere assembly of claim 1 wherein control means for actuating said nominal optical sphere is configured and arranged to randomly rotate said nominal optical sphere.

8. The optical sphere assembly of claim 1 wherein control means for actuating said nominal optical sphere is configured and arranged to selectively rotate said nominal optical sphere so that different preselected areas of its surface are presented to said incoming wavefront at different preselected times.

9. The optical sphere assembly of claim 1 wherein said optical sphere is dynamically balanced.

* * * * *